United States Patent
Gao et al.

(10) Patent No.: US 11,791,719 B2
(45) Date of Patent: Oct. 17, 2023

(54) DEVICE, METHOD, AND SYSTEM FOR RESOLVING COMMON-MODE VOLTAGE INTERFERENCE

(71) Applicant: Huawei Digital Power Technologies Co., Ltd., Shenzhen (CN)

(72) Inventors: Yongbing Gao, Shanghai (CN); Chen Wang, Shanghai (CN); Zhaopeng Liu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 29 days.

(21) Appl. No.: 17/443,730

(22) Filed: Jul. 27, 2021

(65) Prior Publication Data

US 2021/0359597 A1 Nov. 18, 2021

Related U.S. Application Data

(63) Continuation of application No. PCT/CN2019/073432, filed on Jan. 28, 2019.

(51) Int. Cl.
*H02M 1/44* (2007.01)
*H02S 40/32* (2014.01)
(Continued)

(52) U.S. Cl.
CPC ............ *H02M 1/44* (2013.01); *H02M 1/32* (2013.01); *H02M 7/537* (2013.01); *H02S 40/32* (2014.12)

(58) Field of Classification Search
CPC ........... H02S 40/32; H02M 1/44; H02M 1/32; H02M 7/537
See application file for complete search history.

(56) References Cited

U.S. PATENT DOCUMENTS

2009/0152950 A1 6/2009 Zhang et al.
2011/0273917 A1 11/2011 Maitra et al.
(Continued)

FOREIGN PATENT DOCUMENTS

CN 201490725 U 5/2010
CN 103312203 A 9/2013
(Continued)

OTHER PUBLICATIONS

Zhubangtian "Practical anti-jamming technology for electronic circuits," People's Posts and Telecommunications, Total 10 pages (1994). With English Abstract.
(Continued)

*Primary Examiner* — Rafael O De Leon Domenech
(74) *Attorney, Agent, or Firm* — Leydig, Voit & Mayer, Ltd.

(57) ABSTRACT

A device for resolving common-mode voltage interference is applied to a power supply system including a power converter and a switch mechanism. Each phase of an output end of the power converter is connected to a downstream circuit by using the switch mechanism. The switch mechanism includes a first switch and a second switch. The device includes a controller and a passive component. Two ends of the first switch in at least one phase of the output end of the power converter are connected in parallel to the passive component, and the controller controls the second switch to be turned on, and when a voltage difference between the two ends of the first switch is less than a preset voltage, controls the first switch to be turned on. In this manner, the switch mechanism is protected, thereby prolonging a service life of the switch mechanism.

12 Claims, 12 Drawing Sheets

(51) Int. Cl.
  *H02M 1/32* (2007.01)
  *H02M 7/537* (2006.01)

(56) References Cited

U.S. PATENT DOCUMENTS

| | | |
|---|---|---|
| 2013/0235629 A1 | 9/2013 | Zhan et al. |
| 2014/0097804 A1 | 4/2014 | Hasler |
| 2016/0373026 A1* | 12/2016 | Li .............................. H02J 3/26 |
| 2017/0294847 A1 | 10/2017 | Xie et al. |
| 2018/0233929 A1* | 8/2018 | Schultz ................... H02J 7/342 |
| 2018/0254624 A1* | 9/2018 | Son ........................ H02H 9/001 |
| 2018/0309387 A1* | 10/2018 | Hosokawa ................ H02J 7/35 |

FOREIGN PATENT DOCUMENTS

| | | |
|---|---|---|
| CN | 104320042 A | 1/2015 |
| CN | 105186574 A | 12/2015 |
| CN | 105915156 A | 8/2016 |
| CN | 107069686 A | 8/2017 |
| CN | 107086806 A | 8/2017 |
| CN | 206908529 U | 1/2018 |
| CN | 108574403 A | 9/2018 |
| CN | 108667333 A | 10/2018 |
| CN | 109103979 A | 12/2018 |
| KR | 101776160 B1 | 9/2017 |
| WO | 2015192813 A1 | 12/2015 |

OTHER PUBLICATIONS

Yang Xu et al.,"Switching Power Supply Technology," Machine Industry Press, total 8 pages (Jan. 1, 2004). With English abstract.
CN/201980066411.1, Notification of Re-Examination, dated Apr. 10, 2023.
Bingzheng "Low-carbon and energy-saving construction engineering technology," Southeast University Press, printed from Baidu Encyclopedia, Total 4 pages (Oct. 2010). With an English abstract.

* cited by examiner

DEVICE, METHOD, AND SYSTEM FOR RESOLVING COMMON-MODE VOLTAGE INTERFERENCE

CROSS-REFERENCE TO RELATED APPLICATIONS

This application is a continuation of International Application No. PCT/CN2019/073432, filed on Jan. 28, 2019, the disclosure of which is hereby incorporated by reference in its entirety.

TECHNICAL FIELD

Embodiments of this application relate to the technical field of power supply devices, and in particular, to a device, a method, and a system for resolving common-mode voltage interference.

BACKGROUND

In the technical field of photovoltaic power generation, because a photovoltaic module outputs a direct current, an inverter needs to convert the direct current into an alternating current and feed back the alternating current to an alternating current power network or an alternating current load.

An example in which an output end of the inverter is connected to the alternating current power network is used below for description. A switch component is usually connected between the output end of the inverter and the alternating current power network. When the switch component is turned on, the output end of the inverter is connected to the alternating current power network. When the switch component is disconnected, the output end of the inverter is disconnected from the alternating current power network. For safety regulation requirements, two switch components may be connected in series in each phase between the output end of the inverter and the alternating current power network: a first switch component and a second switch component. When one switch component is faulty, the other switch component connected in series to the switch component can be reliably operated, to ensure that the output end of the inverter can be reliably disconnected from the alternating current power network. In normal operation, both of two switch components connected in series in each phase need to be turned on to form a path.

However, in actual application, after the first switch component is turned on and before the second switch component is turned on, there is a relatively large voltage difference between two ends of the second switch component (ground is used as a reference point for the voltage difference). When the second switch component is turned on, voltages at two ends of the switch component are forced to be equal. In this case, there is a relatively large sudden change between the voltages at the two ends of the switch component. A suddenly changed voltage may form a path by using grounded class-Y capacitors or the like at the two ends of the switch component, and a relatively large peak current is generated on the path. The peak current may cause relatively strong interference to a power signal, a control signal, and the like of the inverter, and poses a great risk to normal operation of a system.

SUMMARY

This application provides a device, a method, and a system for resolving common-mode voltage interference, so that a voltage difference between two ends of a switch component can be reduced before the switch component is turned on, to reduce common-mode voltage interference when the switch component is turned on, and protect the switch component and an entire power supply system.

According to a first aspect, an embodiment of this application provides a device for resolving common-mode voltage interference, where the device is applied to a power supply system, the power supply system includes a power converter and a switch mechanism, each phase of an output end of the power converter is connected to a downstream circuit by using the switch mechanism, the power converter is configured to perform electric energy conversion, the switch mechanism includes a first switch component and a second switch component that are connected in series, the device includes a controller and a passive component, two ends of the first switch component in at least one phase of the output end of the power converter are connected in parallel to the passive component, and the controller is configured to: control the second switch component to be turned on, and when a voltage difference between the two ends of the first switch component is less than a preset voltage, control the first switch component to be turned on. There is no sequence for the first switch component and the second switch component.

According to the device provided in this embodiment of this application, two ends of one of two switch components that are connected in series are connected in parallel to the passive component. When a switch component that is not connected in parallel to the passive component is turned on, a high-voltage end charges a low-voltage end by using the passive component. After a period of time of charging, a voltage difference between two ends of the passive component decreases dramatically. If the switch component that is connected in parallel to the passive component is turned on in this case, a common-mode voltage is very low, a corresponding current is relatively weak, and impact on the power supply system is reduced.

The device provided in this embodiment has no requirement for a specific topology of the power supply system, and may be applicable to any form of topology, for example, may be applicable to a scenario in which there is an alternating current side point N or there is no isolation transformer on an alternating current side, and may also be applicable to a case in which there is no alternating current side point N on the alternating current side or there is an isolation transformer on the alternating current side. In both cases, a technical problem that there is a sudden change between voltages at two ends of the switch component can be resolved.

Preferably, two ends of only one of switch components that are operated at the same time in each phase need to be connected in parallel to the passive component. Because ground common-mode voltages of three phases of wires are equal, a passive component in only one phase of wire needs to reduce a voltage difference between two ends of the switch component. In this way, power consumption caused by a resistor can be reduced. Power consumption is generated when a current flows through the resistor. Therefore, a large quantity of resistors connected in parallel leads to large power consumption. However, a large quantity of resistors connected in parallel leads to large insurance, to be specific, two ends of the first switch component in each phase of the output end of the power converter are connected in parallel to the passive component. For example, when some resistors are faulty, another resistor can continue to reduce the voltage difference between the two ends of the switch component.

Preferably, two ends of the second switch component in at least one phase of the output end of the power converter are connected in parallel to the passive component. When two ends of the first switch component and two ends of the second switch component are all connected in parallel to the passive component, a switching sequence of the switch components may not need to be limited. The first switch component may be first turned on, so that the passive component that is connected in parallel to the two ends of the second switch component works. Similarly, the second switch component may be first turned on, and the passive component that is connected in parallel to the two ends of the first switch component works. A problem that a voltage difference between two ends of the switch component is extremely large does not occur, so that a service life of the switch component can be prolonged.

Preferably, two ends of the second switch component in each phase of the output end of the power converter are connected in parallel to the passive component.

Preferably, the passive component includes at least one of or a combination of a plurality of the following components: an inductor, a resistor, a capacitor, and a diode. For example, the passive component may be a resistor. A volume of the resistor is relatively small, product selection is easy, and costs are low.

Preferably, the switch component includes any one of the following components: a relay, a contactor, a circuit breaker, an insulated gate bipolar transistor, and a metal-oxide semiconductor field-effect transistor. A type of the switch component is not specifically limited in this embodiment of this application, and different switch components may be selected for different application scenarios and different voltage levels.

According to a second aspect, an embodiment of this application provides a method for resolving common-mode voltage interference, where the method is applied to the foregoing device, the device is applied to a power supply system, the power supply system includes a power converter and a switch mechanism, each phase of an output end of the power converter is connected to a downstream circuit by using the switch mechanism, the power converter is configured to perform electric energy conversion, the switch mechanism includes a first switch component and a second switch component that are connected in series, the device includes a controller and a passive component, two ends of the first switch component in at least one phase of the output end of the power converter are connected in parallel to the passive component, and the method includes: controlling the second switch component to be turned on, and when a voltage difference between the two ends of the first switch component is less than a preset voltage, controlling the first switch component to be turned on.

According to the method provided in this embodiment, because the two ends of the first switch component are connected in parallel to the passive component, when the second switch component connected in series to the first switch component is turned on first, a high-voltage end charges a low-voltage end by using the passive component, to reduce the voltage difference between the two ends of the first switch component. The first switch component is turned on after a preset period of time. In this case, a case in which there is a very large sudden change between voltages at the two ends of the first switch component due to closing of the first switch component does not occur, so that a common-mode voltage can be reduced, a power supply risk can be prevented in the power supply system, and the switch component is protected, thereby prolonging a service life of the switch component.

According to a third aspect, an embodiment of this application provides a power supply system for resolving common-mode voltage interference, including a power converter, a switch mechanism, and a device, where each phase of an output end of the power converter is connected to a downstream circuit by using the switch mechanism, the power converter is configured to perform electric energy conversion, and the switch mechanism includes a first switch component and a second switch component that are connected in series.

According to the system provided in this embodiment, because two ends of the first switch component are connected in parallel to a passive component, when the second switch component connected in series to the first switch component is turned on first, a high-voltage end charges a low-voltage end by using the passive component, to reduce a voltage difference between the two ends of the first switch component. The first switch component is turned on when the voltage difference between the two ends of the first switch component is less than a preset voltage. In this case, a case in which there is a very large sudden change between voltages at the two ends of the first switch component due to closing of the first switch component does not occur, so that a common-mode voltage can be reduced, a power supply risk can be prevented in the power supply system, and the switch component is protected, thereby prolonging a service life of the switch component. The power supply system may be a three-phase power supply system, or may be a single-phase power supply system.

Preferably, the power converter is an inverter, the downstream circuit is an alternating current power network or an alternating current load, and the inverter is configured to convert a direct current at an input end of the inverter into an alternating current and supply the alternating current to the downstream circuit.

Preferably, the system further includes a photovoltaic module, the input end of the inverter is connected to the photovoltaic module, and the photovoltaic module is configured to convert solar energy into a direct current.

Preferably, the power converter is a rectifier, the downstream circuit is an alternating current power network, and the rectifier is configured to rectify an alternating current at an input end of the rectifier into a direct current and supply the direct current to a direct current load.

It can be learned from the foregoing technical solutions that the embodiments of this application have the following advantages:

The device includes the controller and the passive component. The two ends of the first switch component in at least one phase of the output end of the power converter are connected in parallel to the passive component. The controller controls the second switch component to be turned on, and after the second switch component has been turned on for a preset period of time, controls the first switch component to be turned on. Because the two ends of the first switch component are connected in parallel to the passive component, when the second switch component connected in series to the first switch component is turned on first, the high-voltage end charges the low-voltage end by using the passive component, to reduce the voltage difference between the two ends of the first switch component. The first switch component is turned on after the voltage difference between the two ends of the first switch component is less than the preset voltage. In this case, a case in which there is a very large sudden change between voltages at the two ends of the first switch component due to closing of the first switch component does not occur, so that a common-mode current can be reduced, a power supply risk can be prevented in the power supply system, and the switch component is protected, thereby prolonging a service life of the switch component.

DESCRIPTION OF EMBODIMENTS

To enable a person skilled in the art to better understand the technical solutions provided in the embodiments of this application, the following describes a power supply system with an inverter with reference to the accompanying drawings.

Figure 1:
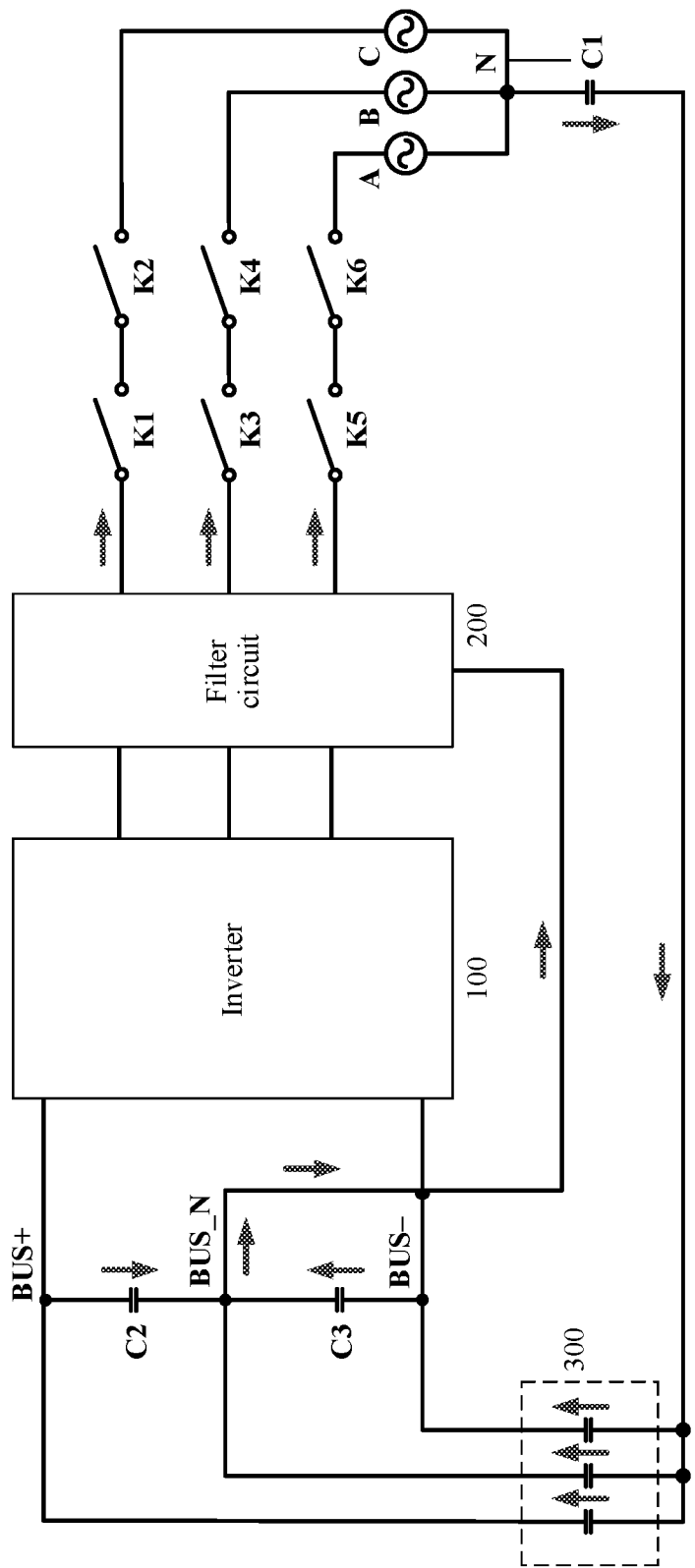
FIG. 1 is a schematic diagram of a power supply system with an inverter.

FIG. 1 is a schematic diagram of a power supply system with an inverter.

An input end of an inverter 100 is connected to a direct current source (not shown in the figure), for example, the direct current source may be a photovoltaic module, or may be another direct current source. The photovoltaic module can convert solar energy into direct current electric energy. Therefore, the photovoltaic module outputs a direct current.

A voltage at a direct current bus midpoint BUS_N at the input end of the inverter 100 is usually half of a direct current bus voltage. The direct current bus voltage is a voltage difference between a positive bus BUS+ and a negative bus BUS−. Two capacitors C2 and C3 with equal capacitance are connected in series between BUS+ and BUS−, in other words, a common point of C2 and C3 is the direct current bus midpoint BUS_N, namely, a direct current side point N. A voltage of BUS_N is obtained by equally dividing the direct current bus voltage by the two capacitors with equal capacitance.

A downstream circuit may be an alternating current power network or an alternating current load. Because most power networks are alternating current power networks, and most loads are also the alternating current loads, the inverter 100 needs to convert a direct current to an alternating current and supply the alternating current to the downstream circuit. A power supply circuit of the downstream circuit may be a three-phase wire or may be a single-phase wire. An inverter on an alternating current power network side may be directly grid-tied or connected to a transformer before being grid-tied. The downstream circuit in FIG. 1 is described by using three-phase direct grid connection as an example.

To supply electric energy of better quality to the downstream circuit, an output end of the inverter 100 may be connected to a filter circuit 200 or a filter circuit 200 is integrated inside the inverter 100. The filter circuit 200 is configured to filter out an interference signal in an alternating current output by the inverter 100. If quality of electric energy output by the inverter 100 is sufficient to meet a requirement of the downstream circuit, the filter circuit 200 may be not disposed.

In FIG. 1, two switch components connected in series are disposed in each phase between an output end of the filter circuit 200 and the downstream circuit. For example, for a phase-A wire, two switch components K5 and K6 connected in series are included; for a phase-B wire, two switch components K3 and K4 connected in series are included; and for a phase-C wire, two switch components K1 and K2 connected in series are included. Two switch components connected in series are disposed in each phase of wire to meet a safety regulation requirement. In case of a fault or an accident, it is ensured that the wire can be disconnected reliably. For example, when K2 is faulty and cannot be disconnected, K1 can be controlled to be disconnected in time, thereby disconnecting the phase-C wire. Another phase of wire is similar to this, and details are not described herein again.

After K1 to K6 are turned on, a ground voltage on a left side of K1, K3, and K5 is equal to a ground voltage on a right side of K2, K4, and K6, but before K1 to K6 are turned on, the ground voltage on the left side of K1, K3, and K5 may not be equal to the ground voltage on the right side of K2, K4, and K6.

When the ground voltage on the left side of K1, K3, and K5 is not equal to the ground voltage on the right side of K2, K4, and K6, in other words, there is a voltage difference between a first end and a second end of K1 to K6, to be specific, the first end is connected to a side of the inverter 100, and the second end is connected to a side of the downstream circuit, the first end and the second end are connected, in other words, are turned on, and there is a sudden change between voltages at the first end and the second end. A suddenly changed voltage generates a relatively strong current by forming a loop between a grounded class-Y capacitor 300 and the filter circuit 200, thereby posing a risk to the power supply system, and also causing adverse impact on the components K1 to K6. Because the suddenly changed voltage forms the loop to the ground, the suddenly changed voltage is a common-mode voltage.

Figure 2:
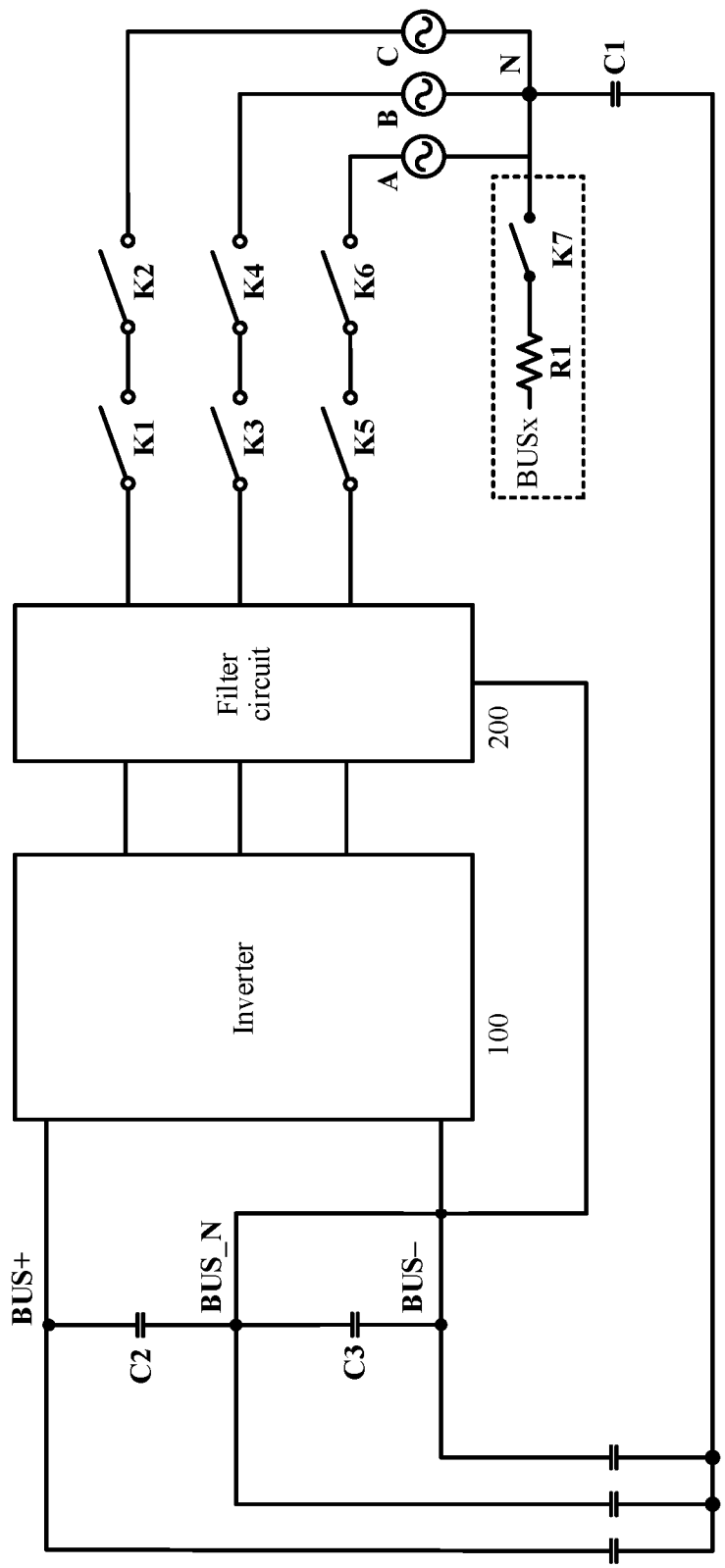
FIG. 2 is a schematic diagram of resolving common-mode voltage interference.

A solution is to add a resistor and a switch between BUS+ and the alternating current side point N or between BUS− and the alternating current side point N. FIG. 2 is a schematic diagram of resolving common-mode voltage interference.

In FIG. 2, BUSx may be BUS+, or may be BUS−. A resistor R1 and a switch K7 that are connected in series are connected between BUSx and the alternating current side point N.

Before K1 to K6 are turned on, the switch K7 is turned on first, to force the ground voltage on the left side of K1, K3, and K5 to be equal to the ground voltage on the right side of K2, K4, and K6 or to reduce a voltage difference between the ground voltage on the left side of K1, K3, and K5 and the ground voltage on the right side of K2, K4, and K6. Then, K1 to K6 are turned on, and then K7 is disconnected after K1 to K6 are turned on and grid tying of the inverter 100 is completed.

However, the solution shown in FIG. 2 is only applicable to a case in which there is the alternating current side point N or there is no isolation transformer on an alternating current side. For a case in which there is no alternating current side point N on the alternating current side or there is an isolation transformer on the alternating current side, the solution shown in FIG. 2 cannot resolve a technical problem that there is a sudden change between voltages at two ends of the switch component.

Therefore, to resolve a problem that there is a voltage difference between two ends of the switch component when the switch component is turned on, an embodiment of this application provides a device for resolving common-mode voltage interference. Two ends of one of two switch components connected in series are connected in parallel to a passive component. When a switch component that is not connected in parallel to the passive component is turned on, a high-voltage end charges a low-voltage end by using the passive component. After a period of time of charging, a voltage difference between two ends of the passive component decreases dramatically. If the switch component that is connected in parallel to the passive component is turned on in this case, a common-mode voltage is very low, a corresponding current is relatively weak, and impact on a power supply system is reduced.

Device Embodiment 1

Figure 3:
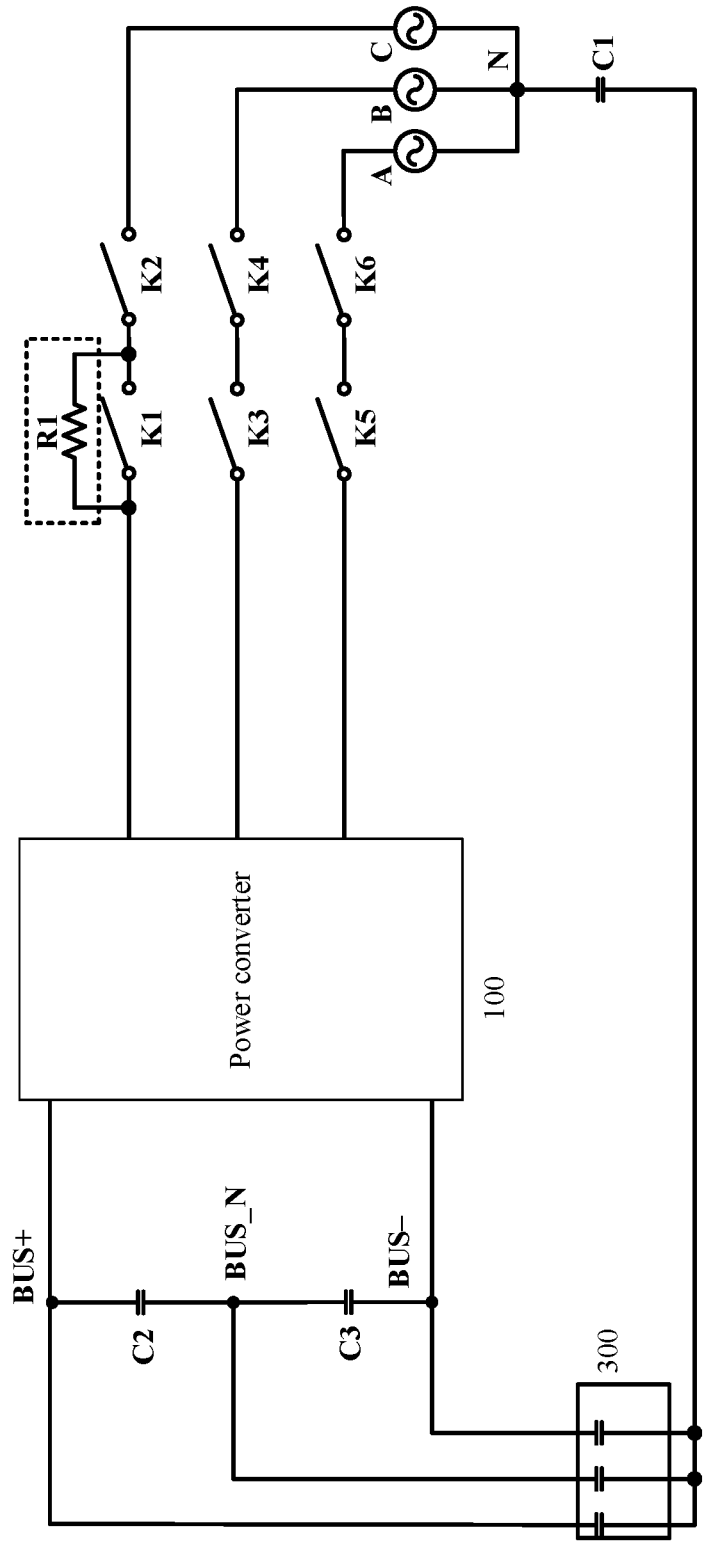
FIG. 3 is a schematic diagram of a device for resolving common-mode voltage interference according to an embodiment of this application.

FIG. 3 is a schematic diagram of a device for resolving common-mode voltage interference according to an embodiment of this application.

The device provided in this embodiment of this application may be applied to a three-phase power supply system, or may be applied to a single-phase power supply system. FIG. 3 shows a device corresponding to the three-phase power supply system.

As shown in FIG. 3, the three-phase power supply system includes a power converter 200 and a switch mechanism. Each phase of an output end of the power converter 200 is connected to a downstream circuit by using the switch mechanism. The power converter 200 is configured to perform electric energy conversion. The switch mechanism includes a first switch component and a second switch component that are connected in series.

The device includes a controller (not shown in the figure) and a passive component.

Two ends of the first switch component in at least one phase of the output end of the power converter 200 are connected in parallel to the passive component.

The controller is configured to: control the second switch component to be turned on, and when a voltage difference between the two ends of the first switch component is less than a preset voltage, control the first switch component to be turned on.

The preset voltage may be determined based on a voltage level of a power supply wire and a resistance presented by the passive component. This is not specifically limited in this embodiment.

There is no sequence for the first switch component and the second switch component, and the first switch component and the second switch component merely mean two switch components that are connected in series in each phase. For example, for a phase-A wire, the first switch component is K5, and the second switch component is K6; for a phase-B wire, the first switch component is K3, and the second switch component is K4; and for a phase-C wire, the first switch component is K1, and the second switch component is K2.

The passive component includes at least one of or a combination of a plurality of the following components: an inductor, a resistor, a capacitor, and a diode. For example, the passive component may be a resistor, may be a resistor and a capacitor, may be a resistor and an inductor, or may be a resistor and a diode. When a diode is included, an anode of the diode is connected to an end that is close to a high voltage, and a cathode of the diode is connected to an end that is close to a low voltage. A specific type of the passive component is not limited in this embodiment of this application.

When the passive component is a resistor, the passive component may be a thermistor in a positive temperature system, may be a thermistor in a negative temperature system, or may be another common resistor.

The switch component may include any one of the following components:

a relay, a contactor, a circuit breaker, an insulated gate bipolar transistor (IGBT), and a metal-oxide semiconductor (MOS) field-effect transistor. A specific type of the switch component is not limited in this embodiment of this application.

In descriptions of FIG. 3, for example, two ends of the first switch component in one phase are connected in parallel to the passive component, and the passive component is a resistor. As shown in FIG. 3, two ends of K1 in the phase-C wire are connected in parallel to a resistor R1.

After K2 is turned on, the phase-C wire forms a path. An output voltage of the power converter 100 is charged to a K2 side through R1, and a voltage on the K2 side is increasingly high. When a voltage difference between the two ends of K1 or a voltage difference between ground voltages at the two ends of K1 is relatively small, K1 is turned on, and in this case, a suddenly changed voltage is relatively low, a common-mode voltage is also low, and a suddenly changed current flowing through a grounded class-Y capacitor 300 is also relatively weak, thereby reducing impact on the power supply system. Impact on the component K1 is also small, so that the switch component can be protected.

In actual application, the voltage difference between the two ends of K1 may be implemented through actual measurement. For example, a voltage sensor measures the ground voltages separately at the two ends of K1, and then obtains a ground voltage difference between the two ends of K1 to determine whether the voltage difference is less than the preset voltage. When the voltage difference is less than the preset voltage, it indicates that the voltage difference between the two ends of K1 is relatively small, and a high suddenly changed voltage is not generated if K1 is turned on in this case. The voltage sensor may be a potential transformer, or may be another voltage detection component.

In addition, the voltage difference between the two ends of K1 may not be actually measured, but K1 is turned on after K2 has been turned on for a preset period of time. The preset period of time may be set based on a specific application scenario, for example, may be determined based on a voltage level of a power supply circuit and a resistance presented by the passive component. In the following embodiment, closing K1 after a preset time is used as an example for description.

Figure 4:
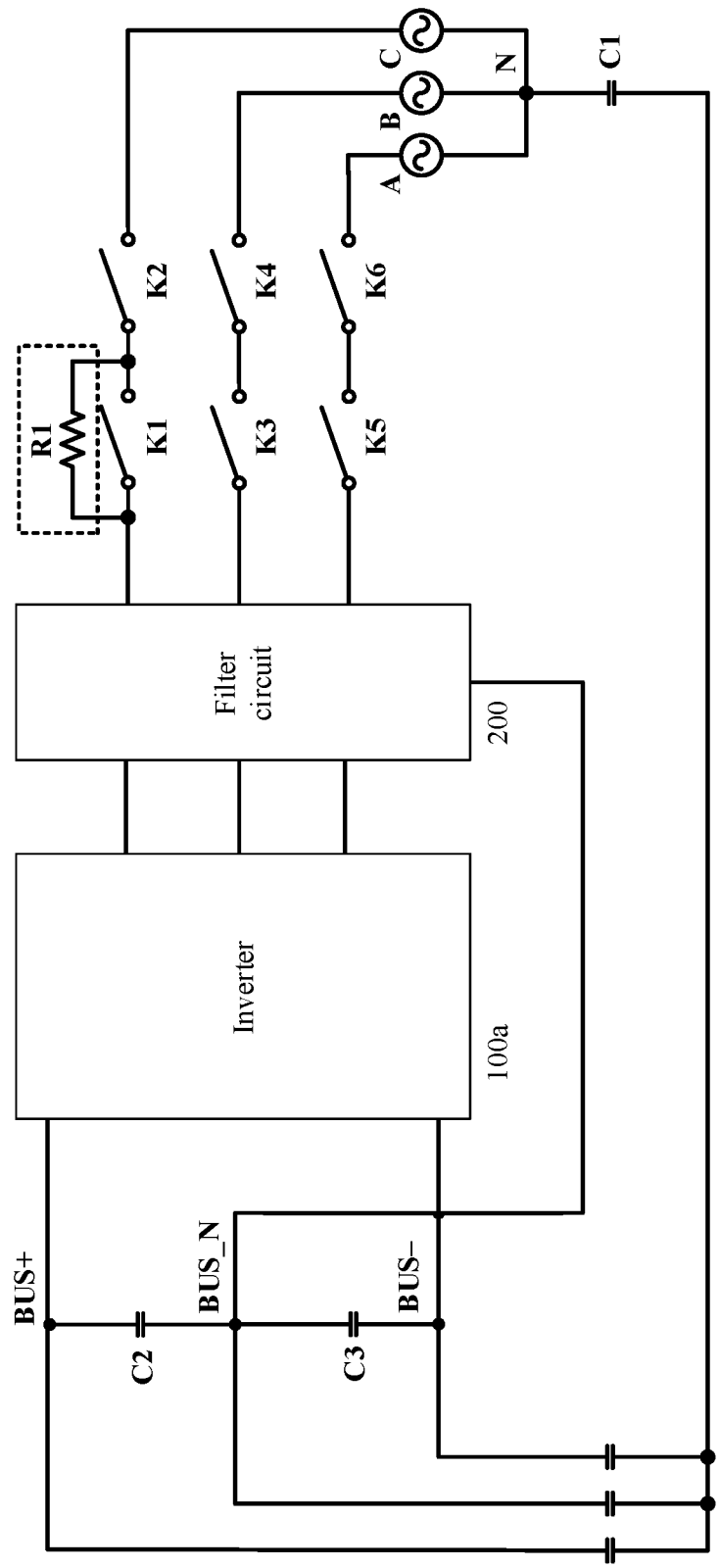
FIG. 4 is a schematic diagram of another device for resolving common-mode voltage interference according to an embodiment of this application.

There is no filter circuit in the device shown in FIG. 3. It may be understood that, to enable the power converter 100 to supply electric energy of relatively high quality to a downstream circuit, the filter circuit 200 may be connected to the output end of the power converter 100. As shown in FIG. 4, the filter circuit 200 is configured to filter out an interference signal in an alternating current output by the power converter 100.

The device provided in this embodiment has no requirement for a specific topology of the power supply system, and may be applicable to any form of topology, for example, may be applicable to a scenario in which there is an alternating current side point N or there is no isolation transformer on an alternating current side, and may also be applicable to a case in which there is no alternating current side point N on the alternating current side or there is an isolation transformer on the alternating current side. In both cases, a technical problem that there is a sudden change between voltages at two ends of the switch component can be resolved.

Device Embodiment 2

It should be noted that the power converter 100 in FIG. 1 may be used as both an inverter and a rectifier, in other words, may be a bidirectional converter. When the power converter 100 is used as an inverter, electric energy is transferred from the inverter to the downstream circuit. When the power converter 100 is used as a rectifier, electric energy is transferred from the downstream circuit to the rectifier. A specific type of the power converter 100 is not specifically limited in this embodiment of this application. In the following embodiment, that the power inverter 100 is an inverter is used as an example for description.

Figure 5:
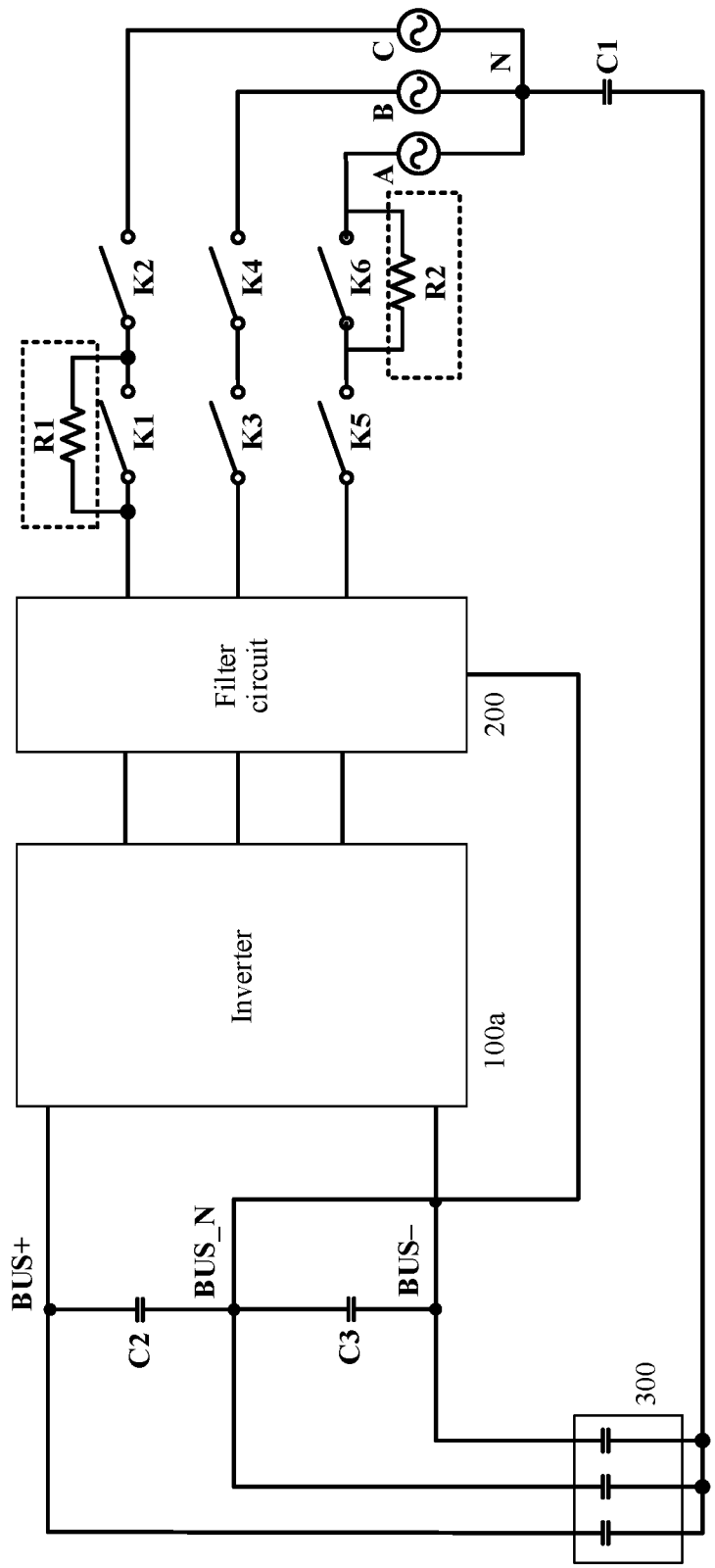
FIG. 5 is a schematic diagram of still another device for resolving common-mode voltage interference according to an embodiment of this application.

FIG. 5 is a schematic diagram of still another device for resolving common-mode voltage interference according to an embodiment of this application.

In the devices shown in FIG. 3 and FIG. 4, the resistor R1 is connected in parallel only to two ends of K1, and no passive component is connected in parallel to two ends of another switch. This case is applicable to a scenario in which K2 is turned on first. In other words, when K2 is turned on first, K1 is not turned on, and a high-voltage end charges a low-voltage end by using R1. However, if K1 is to be turned on first, the passive component needs to be connected in parallel only to two ends of a switch that is operated at the same time as K2. It should be noted that in a three-phase wire, switches corresponding to the three-phase wire are usually operated at the same time. For example, K5 of a phase A, K3 of a phase B, and K1 of a phase C are turned on at the same time and disconnected at the same time. Similarly, K6 of the phase A, K4 of the phase B, and K2 of the phase C are turned on at the same time and disconnected at the same time.

Therefore, to resolve a technical problem of common-mode voltage interference regardless of whether K1 is turned on first or K2 is turned on first, the passive component needs to be connected in parallel to two ends of any switch in K1, K3, and K5, and at the same time, the passive component is also connected in parallel to two ends of any switch in K2, K4, and K6.

In FIG. 5, a resistor R2 is merely schematically connected in parallel to two ends of K6. It may be understood that R2 may also be connected in parallel to two ends of K2 or K4.

A working principle of the device shown in FIG. 5 is described below.

A scenario in which K2 is turned on first has been described in FIG. 3. A scenario in which K1 is turned on first is described below. It may be understood that a scenario in which K1 is turned on first, or K3 is turned on first, or K5 is turned on first is similar to this.

When K1 is turned on, K5 is also turned on due to simultaneous operation. After K5 is turned on, a high-voltage end charges a low-voltage end by using R2. After a preset period of time, a voltage difference between two ends of K6 decreases. If K6 is turned on in this case, a suddenly changed voltage is relatively low, a common-mode voltage is also low, and a suddenly changed current flowing through a grounded class-Y capacitor 300 is also relatively weak, thereby reducing impact on a power supply system. Impact on the component K6 is also small, so that the switch component can be protected.

In actual application, K1, K3, and K5 may be integrated. For example, a group of relays include three switches, and the three switches are separately connected in series in each phase of wire and are operated at the same time. Similarly, K2, K4, and K6 may also be integrated. In other words, a group of relays include three switches, and the three switches are separately connected in series in each phase of wire and are operated at the same time. Alternatively, K1, K4, and K5 may be integrated, and K2, K3, and K6 are integrated. This is not specifically limited.

The device provided in this embodiment includes both R1 and R2. Therefore, whether the first switch component (K1, K3, and K5) is turned on first or the second switch component (K2, K4, and K6) is first turned on may not need to be limited, and whether the first switch component or the second switch component is first turned on may be at random, and a problem that a voltage difference between two ends of the switch component is extremely large does not occur, thereby prolonging a service life of the switch component.

In the device shown in FIG. 5, two ends of only one of switch components that are operated at the same time in each phase need to be connected in parallel to the passive component. Because ground common-mode voltages of three phases of wires are equal, a passive component in only one phase of wire needs to reduce a voltage difference between two ends of the switch component. In this way, power consumption caused by a resistor can be reduced.

In FIG. 5, two ends of one switch component in each group of switch components are merely schematically connected in parallel to the switch component. It may be understood that two ends of a plurality of switch components may all be connected in parallel to the switch component. This is described in detail below with reference to FIG. 6.

Device Embodiment 3

Figure 6:
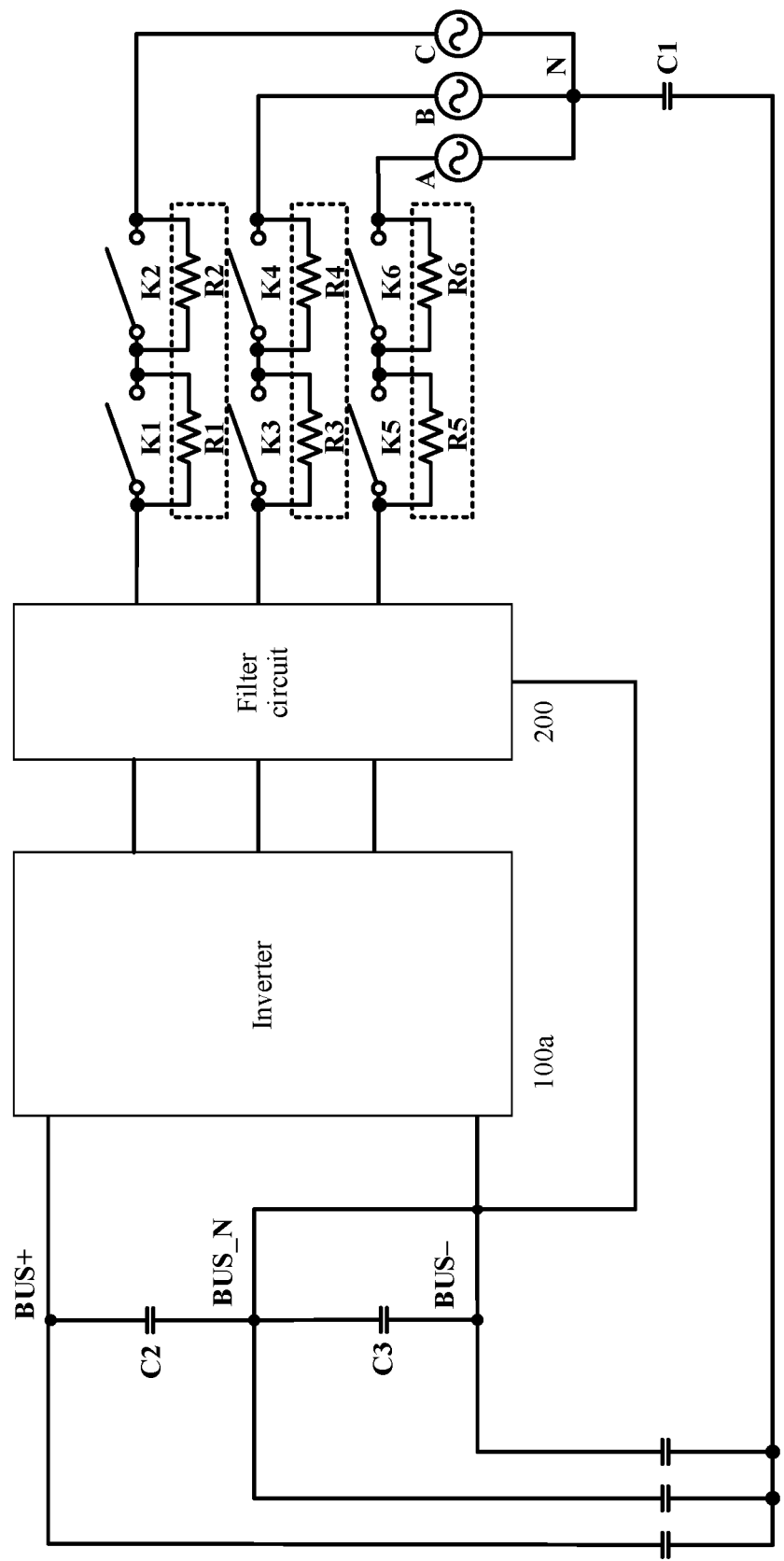
FIG. 6 is a schematic diagram of yet another device for resolving common-mode voltage interference according to an embodiment of this application.

FIG. 6 is a schematic diagram of yet another device for resolving common-mode voltage interference according to an embodiment of this application.

For ease of understanding, in FIG. 6, two ends of each switch component are connected in parallel to a passive component, and a resistor is still used as an example for description.

As shown in FIG. 6, two ends of K1 are connected in parallel to R1, two ends of K2 are connected in parallel to R2, two ends of K3 are connected in parallel to R3, two ends of K4 are connected in parallel to R4, two ends of K5 are connected in parallel to R5, and two ends of K6 are connected in parallel to R6. There may be a plurality of combinations for R1 to R6, for example, R1 to R6 may exist independently, may be in combinations of two, or may be in combinations of three. Table 1 below shows existence of R1 to R6 corresponding to FIG. 6, where 1 indicates that there is a resistor, and 0 indicates that there is no resistor.

TABLE 1

| R1 | R2 | R3 | R4 | R5 | R6 |
|---|---|---|---|---|---|
| 0 | 0 | 0 | 0 | 0 | 1 |
| 0 | 0 | 0 | 0 | 1 | 0 |
| 0 | 0 | 0 | 0 | 1 | 1 |
| 0 | 0 | 0 | 1 | 0 | 0 |
| 0 | 0 | 0 | 1 | 0 | 1 |
| 0 | 0 | 0 | 1 | 1 | 0 |
| 0 | 0 | 0 | 1 | 1 | 1 |
| 0 | 0 | 1 | 0 | 0 | 0 |
| 0 | 0 | 1 | 0 | 0 | 1 |
| 0 | 0 | 1 | 0 | 1 | 0 |
| 0 | 0 | 1 | 0 | 1 | 1 |
| 0 | 0 | 1 | 1 | 0 | 0 |
| 0 | 0 | 1 | 1 | 0 | 1 |
| 0 | 0 | 1 | 1 | 1 | 0 |
| 0 | 0 | 1 | 1 | 1 | 1 |
| 0 | 1 | 0 | 0 | 0 | 0 |
| 0 | 1 | 0 | 0 | 0 | 1 |
| 0 | 1 | 0 | 0 | 1 | 0 |
| 0 | 1 | 0 | 0 | 1 | 1 |
| 0 | 1 | 0 | 1 | 0 | 0 |
| 0 | 1 | 0 | 1 | 0 | 1 |
| 0 | 1 | 0 | 1 | 1 | 0 |
| 0 | 1 | 0 | 1 | 1 | 1 |
| 0 | 1 | 1 | 0 | 0 | 0 |
| 0 | 1 | 1 | 0 | 0 | 1 |
| 0 | 1 | 1 | 0 | 1 | 0 |
| 0 | 1 | 1 | 0 | 1 | 1 |
| 0 | 1 | 1 | 1 | 0 | 0 |
| 0 | 1 | 1 | 1 | 0 | 1 |
| 0 | 1 | 1 | 1 | 1 | 0 |
| 0 | 1 | 1 | 1 | 1 | 1 |
| 1 | 0 | 0 | 0 | 0 | 0 |
| 1 | 0 | 0 | 0 | 0 | 1 |
| 1 | 0 | 0 | 0 | 1 | 0 |
| 1 | 0 | 0 | 0 | 1 | 1 |
| 1 | 0 | 0 | 1 | 0 | 0 |
| 1 | 0 | 0 | 1 | 0 | 1 |
| 1 | 0 | 0 | 1 | 1 | 0 |
| 1 | 0 | 0 | 1 | 1 | 1 |
| 1 | 0 | 1 | 0 | 0 | 0 |
| 1 | 0 | 1 | 0 | 0 | 1 |
| 1 | 0 | 1 | 0 | 1 | 0 |
| 1 | 0 | 1 | 0 | 1 | 1 |
| 1 | 0 | 1 | 1 | 0 | 0 |
| 1 | 0 | 1 | 1 | 0 | 1 |
| 1 | 0 | 1 | 1 | 1 | 0 |
| 1 | 0 | 1 | 1 | 1 | 1 |
| 1 | 1 | 0 | 0 | 0 | 0 |
| 1 | 1 | 0 | 0 | 0 | 1 |
| 1 | 1 | 0 | 0 | 1 | 0 |
| 1 | 1 | 0 | 0 | 1 | 1 |
| 1 | 1 | 0 | 1 | 0 | 0 |
| 1 | 1 | 0 | 1 | 0 | 1 |
| 1 | 1 | 0 | 1 | 1 | 0 |
| 1 | 1 | 0 | 1 | 1 | 1 |
| 1 | 1 | 1 | 0 | 0 | 0 |
| 1 | 1 | 1 | 0 | 0 | 1 |
| 1 | 1 | 1 | 0 | 1 | 0 |
| 1 | 1 | 1 | 0 | 1 | 1 |
| 1 | 1 | 1 | 1 | 0 | 0 |
| 1 | 1 | 1 | 1 | 0 | 1 |
| 1 | 1 | 1 | 1 | 1 | 0 |
| 1 | 1 | 1 | 1 | 1 | 1 |

For example, in a first row of Table 1, only R6 corresponds to 1, in other words, R6 exists, and R6 is connected in parallel to two ends of K6. No passive component is connected in parallel to two ends of K1 to K5.

There is 1 at each location in a last row of Table 1, in other words, R1 to R6 all correspond to 1, in other words, R1 to R6 all exist, to be specific, two ends of K1 to two ends of K6 are separately connected in parallel to R1 to R6.

Power consumption is generated when a current flows through the resistor. Therefore, a large quantity of resistors connected in parallel leads to large power consumption. However, a large quantity of resistors connected in parallel leads to large insurance. For example, when some resistors are faulty, another resistor can continue to reduce a voltage difference between two ends of the switch component.

Device Embodiment 4

The foregoing embodiments are all described by using an example in which a power supply circuit is a three-phase circuit. The device provided in this embodiment of this application is also applicable to a single-phase power supply circuit. Therefore, application of the device in the single-phase power supply circuit is described below with reference to the accompanying drawings.

Figure 7:
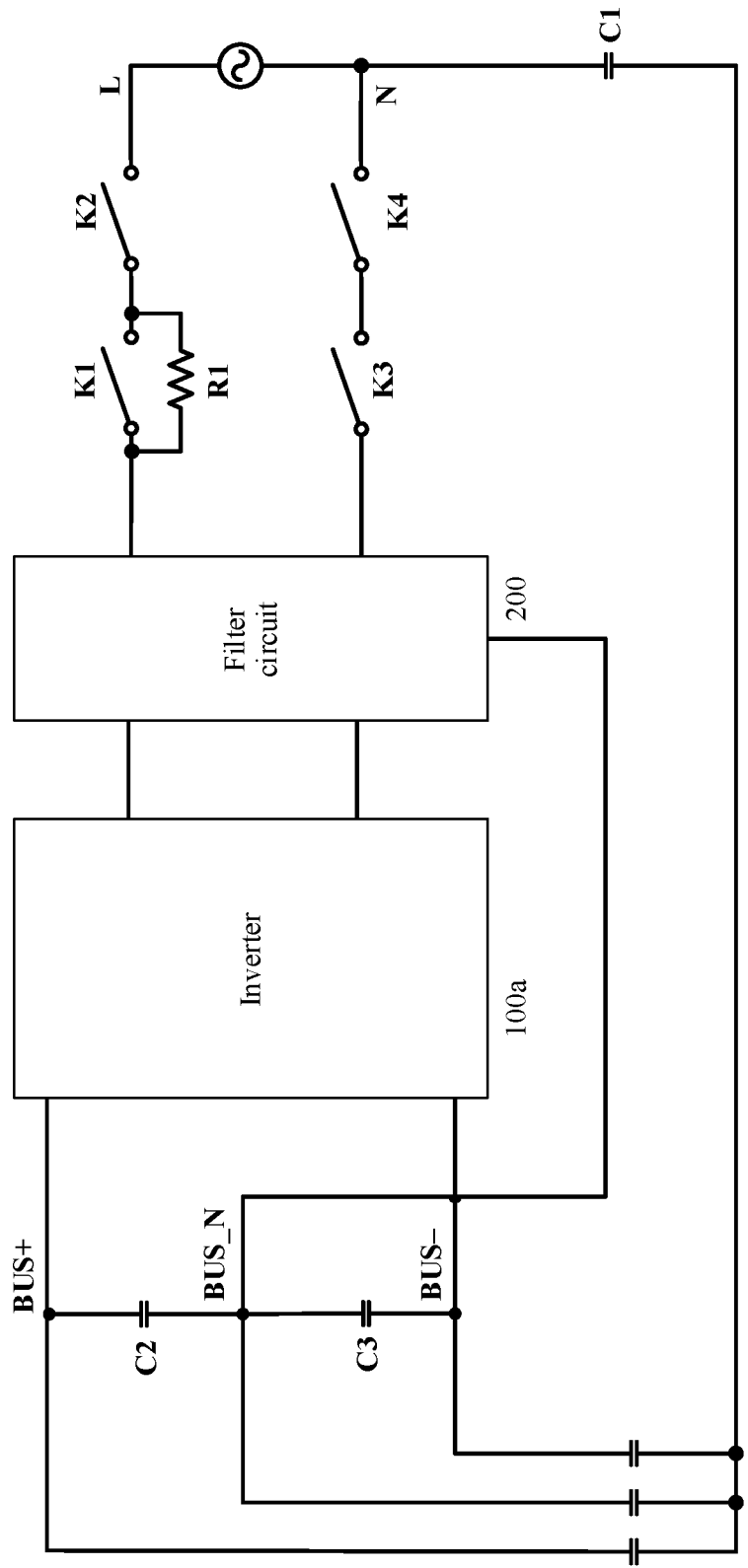
FIG. 7 is a schematic diagram of a further device for resolving common-mode voltage interference according to an embodiment of this application.

FIG. 7 is a schematic diagram of a further device for resolving common-mode voltage interference according to an embodiment of this application.

Similar to a three-phase power supply circuit, for safety reasons, after one switch component fails, another switch component can reliably disconnect a power supply path. Therefore, an L wire and an N wire in the single-phase power supply circuit may each include two switch components that are connected in series. As shown in FIG. 7, the L wire includes two switch components K1 and K2 that are connected in series, and the N wire includes two switch components K3 and K4 that are connected in series.

A passive component may be connected in parallel to two ends of only one switch component in the L wire or the N wire. In this embodiment, a resistor is still used as an example of the passive component for description. Alternatively, the passive component may be connected in parallel to two ends of two switch components that are connected in series in the L wire or the N wire.

In FIG. 7, that R1 is connected in parallel to two ends of a first switch component K1 in the L wire is used as an example for description.

For example, electric energy is transmitted from an inverter to an alternating current power network. When K2 is turned on first, an output end of an inverter 100a is a high-voltage end, and the high-voltage end charges a K2 side by using R1. After a preset period of time, a voltage difference between two ends of K1 is reduced, and K1 is turned on in this case, to avoid common-mode interference caused by a suddenly changed voltage.

Similar to a three-phase power supply circuit, because a ground common-mode voltage of the L wire and a ground common-mode voltage of the N wire are equal, an objective can be achieved by connecting only one passive component in parallel in the L wire or the N wire.

It should be noted that, in actual application, K1 and K3 are operated at the same time, and K2 and K4 are operated at the same time.

Figure 8:
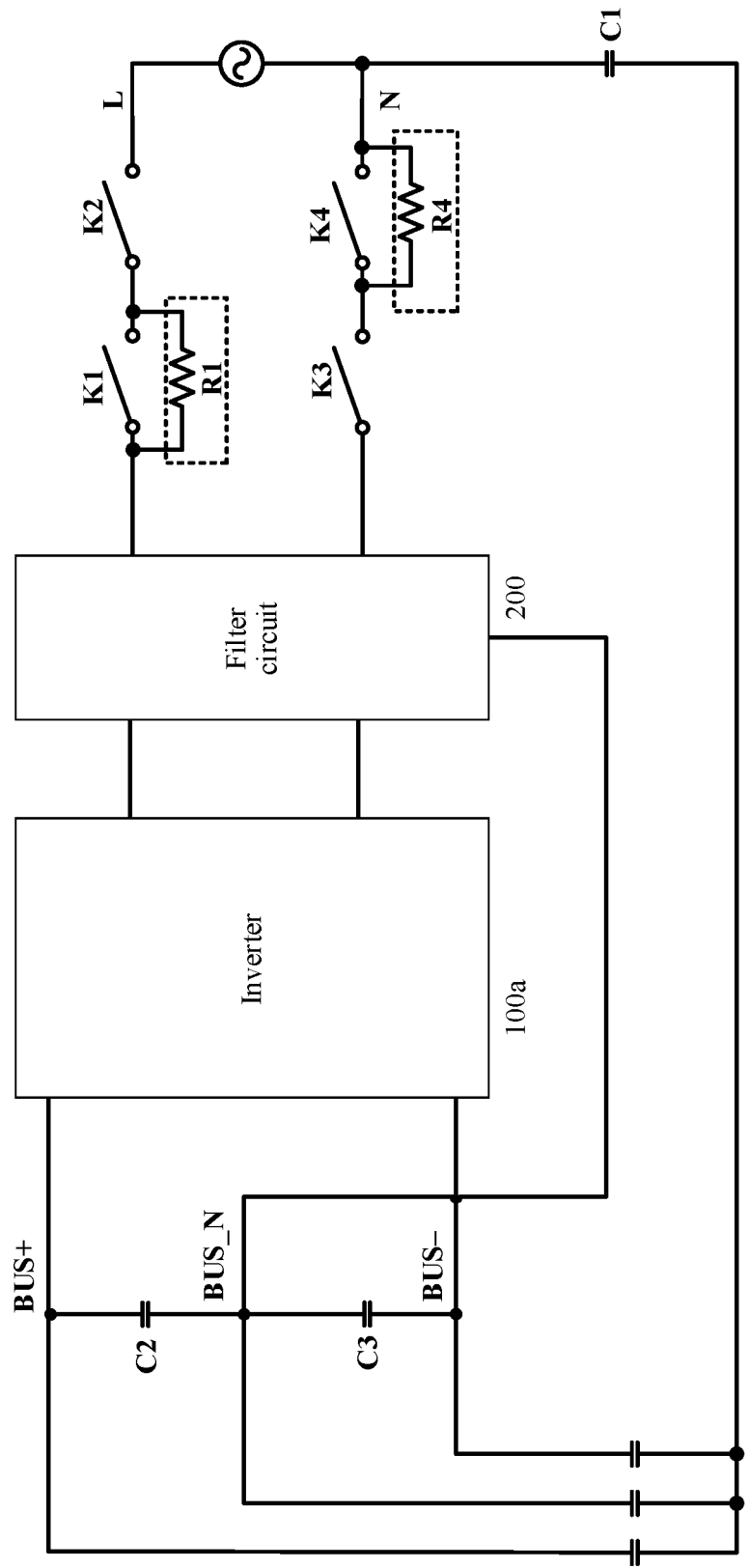
FIG. 8 is a schematic diagram in which a device provided in an embodiment of this application is applied to a single-phase power supply system.

In FIG. 7, a common-mode voltage can be suppressed only when K2 is turned on first. If K1 is turned on first, the passive component also needs to be connected in parallel to two ends of K2 or K4. As shown in FIG. 8, that a resistor R4 is connected in parallel to two ends of K4 is used as an example for description.

K1 is turned on first, in other words, K3 is turned on at the same time. In this case, a high-voltage end charges a low-voltage end by using R4, to reduce a voltage difference between two ends of K4. K4 is turned on after a preset period of time, so that a common-mode voltage can be suppressed.

In the device shown in FIG. 8, whether K1 is turned on first or K2 is turned on first or whether K3 is turned on first or K4 is turned on first is not limited, in other words, switch components may be successively turned on at random, so that the common-mode voltage can be suppressed. In addition, the passive component is connected in parallel only to switch components that are not operated at the same time. In FIG. 8, the passive component is connected in parallel to two ends of K1 and two ends of K4. Similarly, the passive component may be connected in parallel to two ends of K1 and two ends of K2, or the passive component may be connected in parallel to two ends of K2 and two ends of K3.

In addition, similar to a three-phase power supply circuit, the passive component may be connected in parallel to two ends of each switch component, so that when some passive components are faulty, another passive component can suppress the common-mode voltage.

An implementation status of connecting switch components in parallel in the L wire and the N wire is described below with reference to Table 2.

Figure 9:
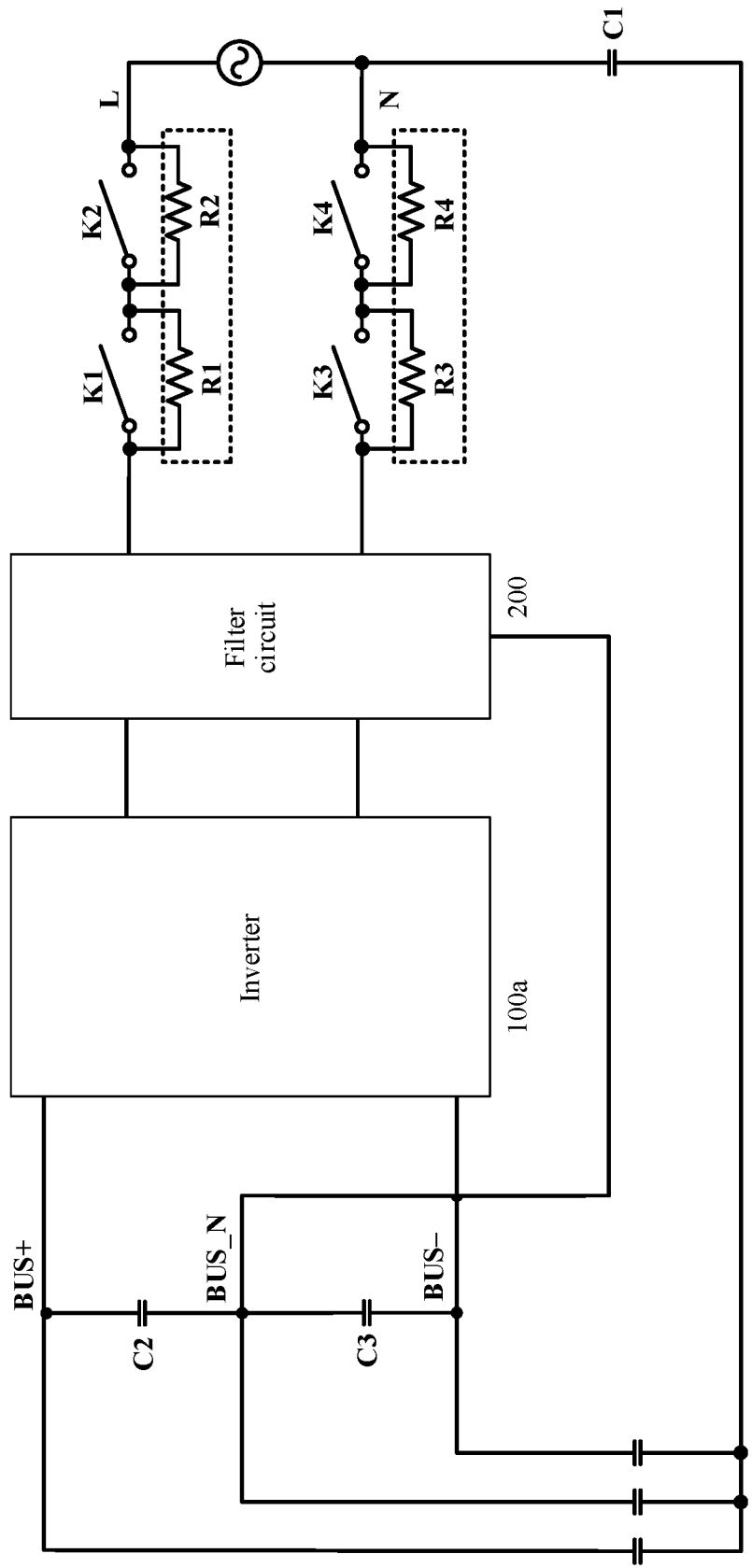
FIG. 9 is another schematic diagram in which a device provided in an embodiment of this application is applied to a single-phase power supply system.

In FIG. 9, two ends of K1 to two ends of K4 are separately connected in parallel to R1 to R4. R1 to R4 may exist independently, or may be in combinations of two. Table 2 below shows existence of R1 to R4 corresponding to FIG. 9, where 1 indicates that there is a resistor, and 0 indicates that there is no resistor.

TABLE 2

| R1 | R2 | R3 | R4 |
|---|---|---|---|
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

In a first row of Table 2, R4 corresponds to 1, and R1 to R3 correspond to 0. Therefore, it indicates that R4 exists, in other words, R4 is connected in parallel to two ends of K4. R1 to R4 all correspond to 1 in a last row of Table 2, in other words, it indicates that R1 to R4 all exist, to be specific, two ends of K1 to two ends of K4 are respectively connected in parallel to R1 to R4.

Device Embodiment 5

Figure 10:
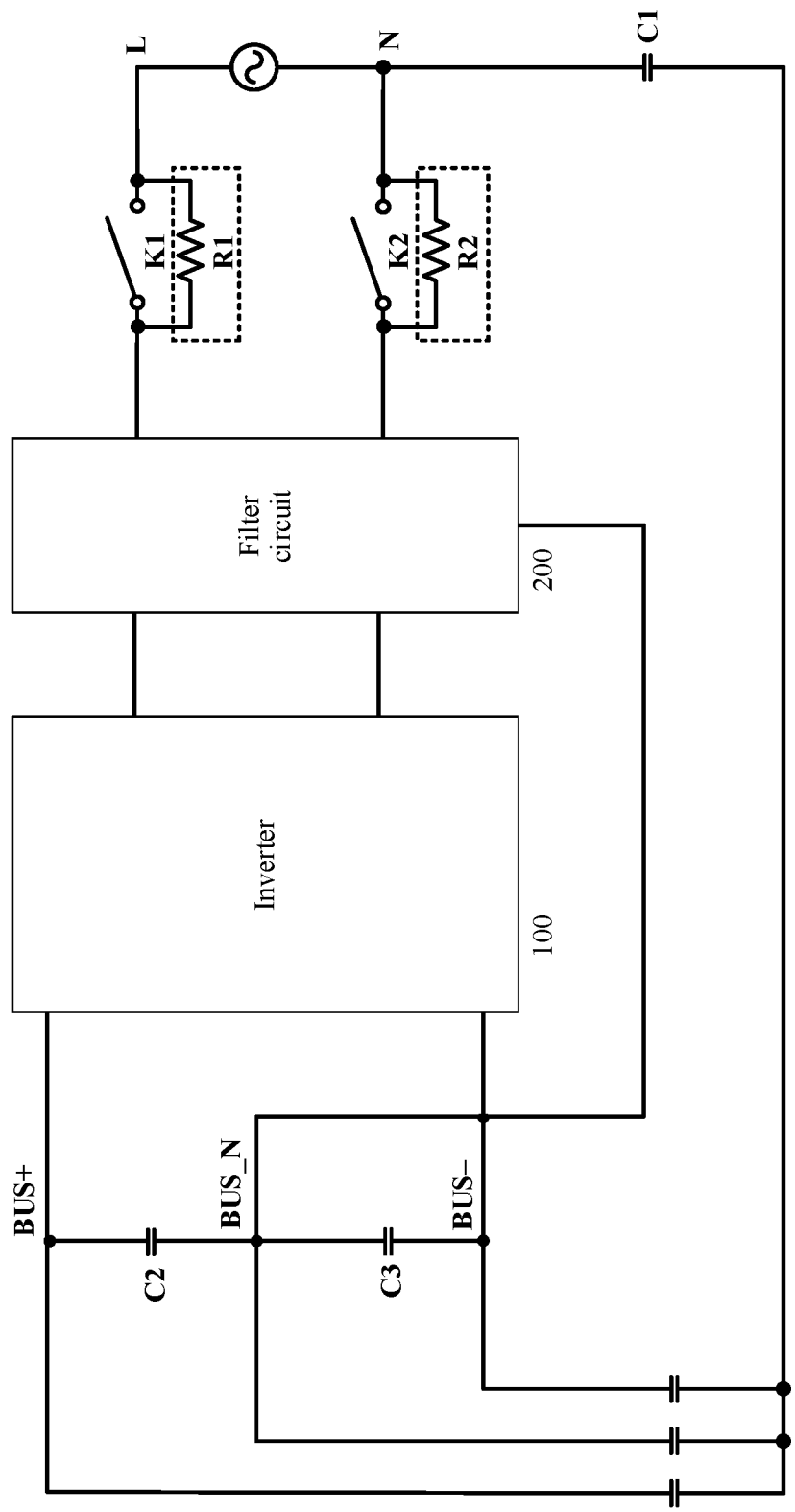
FIG. 10 is still another schematic diagram in which a device provided in an embodiment of this application is applied to a single-phase power supply system.

FIG. 10 is a schematic diagram of still another device for resolving common-mode voltage interference according to an embodiment of this application.

A voltage of a single-phase power supply circuit is lower than a voltage of a three-phase power supply circuit, and a safety regulation requirement of the single-phase power supply circuit is different from that of a three-phase power supply system. Therefore, an L wire and an N wire may each include only one switch component, as shown in FIG. 10. A switch component K1 is connected in series in the L wire, and a switch component K2 is connected in series in the N wire.

A passive component R1 may be connected in parallel only to two ends of K1, or a passive component R2 may be connected in parallel only to two ends of K2. Alternatively, R1 and R2 may be respectively connected in parallel to two ends of K1 and two ends of K2. In other words, for existence of R1 and R2, refer to Table 3.

TABLE 3

| R1 | R2 |
|---|---|
| 0 | 1 |
| 1 | 0 |
| 1 | 1 |

1 indicates that there is a resistor, and 0 indicates that there is no resistor. In a first row of Table 3, R2 corresponds to 1, indicating that R2 is connected in parallel to two ends of K2, and R1 corresponds to 0, indicating that the passive component R1 is not connected in parallel to two ends of K1. In a third row of Table 3, both R1 and R2 correspond to 1, indicating that R1 and R2 are respectively connected in parallel to two ends of K1 and two ends of K2.

When the L wire and the N wire shown in FIG. 10 include only one switch component, after an inverter 100a is powered on, K1 and K2 may be not turned on first, and a high-voltage end may charge a low-voltage end by using the resistors R1 and R2. As time elapses, a voltage difference between two ends of K1 and a voltage difference between two ends of K2 decrease. K1 and K2 are turned on after a preset period of time. In this case, a suddenly changed voltage is relatively low, a common-mode voltage is also low, and a suddenly changed current flowing through a grounded class-Y capacitor 300 is also relatively weak, thereby reducing impact on a power supply system. Impact on the switch component is also small, so that the switch component can be protected.

Based on the device for resolving common-mode voltage interference provided in the foregoing embodiments, an embodiment of this application further provides a method for resolving common-mode voltage interference. Detailed descriptions are provided below with reference to the accompanying drawings.

Method Embodiment

Figure 11:
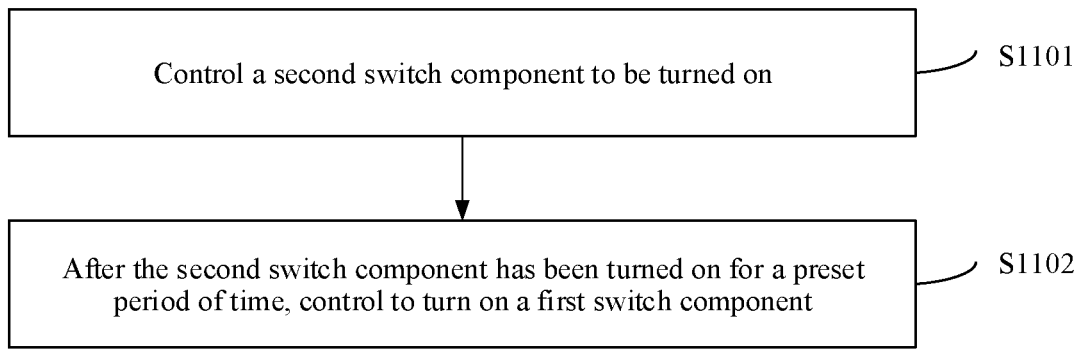
FIG. 11 is a flowchart of a method for resolving common-mode voltage interference according to an embodiment of this application.

FIG. 11 is a flowchart of a method for resolving common-mode voltage interference according to an embodiment of this application.

The method for resolving common-mode voltage interference provided in this embodiment is applied to the device described in the foregoing embodiments. The device is applied to a power supply system, the power supply system includes a power converter and a switch mechanism, each phase of an output end of the power converter is connected to a downstream circuit by using the switch mechanism, the power converter is configured to perform electric energy conversion, the switch mechanism includes a first switch component and a second switch component that are connected in series, the device includes a controller and a passive component, and two ends of the first switch component in at least one phase of the output end of the power converter are connected in parallel to the passive component.

The method includes the following steps:

S1101: Control the second switch component to be turned on.

S1102: Turn on the first switch component when a voltage between the two ends of the first switch component is less than a preset voltage.

The method may be applied to a three-phase power supply system, or may be applied to a single-phase power supply system. This is not specifically limited in this embodiment of this application.

There is no sequence for the first switch component and the second switch component, and the first switch component and the second switch component merely mean two switch components that are connected in series in each phase.

The passive component includes at least one of or a combination of a plurality of the following components: an inductor, a resistor, a capacitor, and a diode. For example, the passive component may be a resistor, may be a resistor and a capacitor, may be a resistor and an inductor, or may be a resistor and a diode. When a diode is included, an anode of the diode is connected to an end that is close to a high voltage, and a cathode of the diode is connected to an end that is close to a low voltage. A specific type of the passive component is not limited in this embodiment of this application.

The switch component may include any one of the following components:

a relay, a contactor, a circuit breaker, an insulated gate bipolar transistor (IGBT), and a metal-oxide semiconductor (MOS) field-effect transistor. A specific type of the switch component is not limited in this embodiment of this application.

A preset period of time may be set based on a specific application scenario, for example, may be determined based on a voltage level of a power supply circuit and a resistance presented by the passive component.

According to the method provided in this embodiment, because the two ends of the first switch component are connected in parallel to the passive component, when the second switch component connected in series to the first switch component is turned on first, a high-voltage end charges a low-voltage end by using the passive component, to reduce a voltage difference between the two ends of the first switch component. The first switch component is turned on after a preset period of time. In this case, a case in which there is a very large sudden change between voltages at the two ends of the first switch component due to closing of the first switch component does not occur, so that a common-mode voltage can be reduced, a power supply risk can be prevented in the power supply system, and the switch component is protected, thereby prolonging a service life of the switch component.

Based on the device and the method for resolving common-mode voltage interference provided in the foregoing embodiments, an embodiment of this application further provides a power supply system for resolving common-mode voltage interference. Detailed descriptions are provided below with reference to the accompanying drawings.

System Embodiment 1

Still refer to FIG. 3. A power supply system for resolving common-mode voltage interference provided in this embodiment includes a power converter 100, a switch mechanism, and the device described in the foregoing embodiments.

Each phase of an output end of the power converter 100 is connected to a downstream circuit by using the switch mechanism.

The power converter 100 is configured to perform electric energy conversion. The power converter 100 may be used as an inverter, or may be used as a rectifier, in other words, may be a bidirectional converter. When the power converter 100 is used as an inverter, electric energy is transferred from the inverter to the downstream circuit. When the power converter is used as a rectifier, electric energy is transferred from the downstream circuit to the rectifier. A specific type of the power converter is not specifically limited in this embodiment of this application.

The switch mechanism includes a first switch component and a second switch component that are connected in series.

It may be understood that the power supply system described above may be a three-phase power supply system, or may be a single-phase power supply system. FIG. 3 shows the three-phase power supply system.

According to the system provided in this embodiment, because two ends of the first switch component are connected in parallel to a passive component, when the second switch component connected in series to the first switch component is turned on first, a high-voltage end charges a low-voltage end by using the passive component, to reduce a voltage difference between the two ends of the first switch component. The first switch component is turned on when the voltage difference between the two ends of the first switch component is less than a preset voltage. In this case, a case in which there is a very large sudden change between voltages at the two ends of the first switch component due to closing of the first switch component does not occur, so that a common-mode voltage can be reduced, a power supply risk can be prevented in the power supply system, and the switch component is protected, thereby prolonging a service life of the switch component.

When the power converter is an inverter, the downstream circuit is an alternating current power network or an alternating current load.

The inverter is configured to convert a direct current at an input end of the inverter into an alternating current and supply the alternating current to the downstream circuit.

Figure 12:
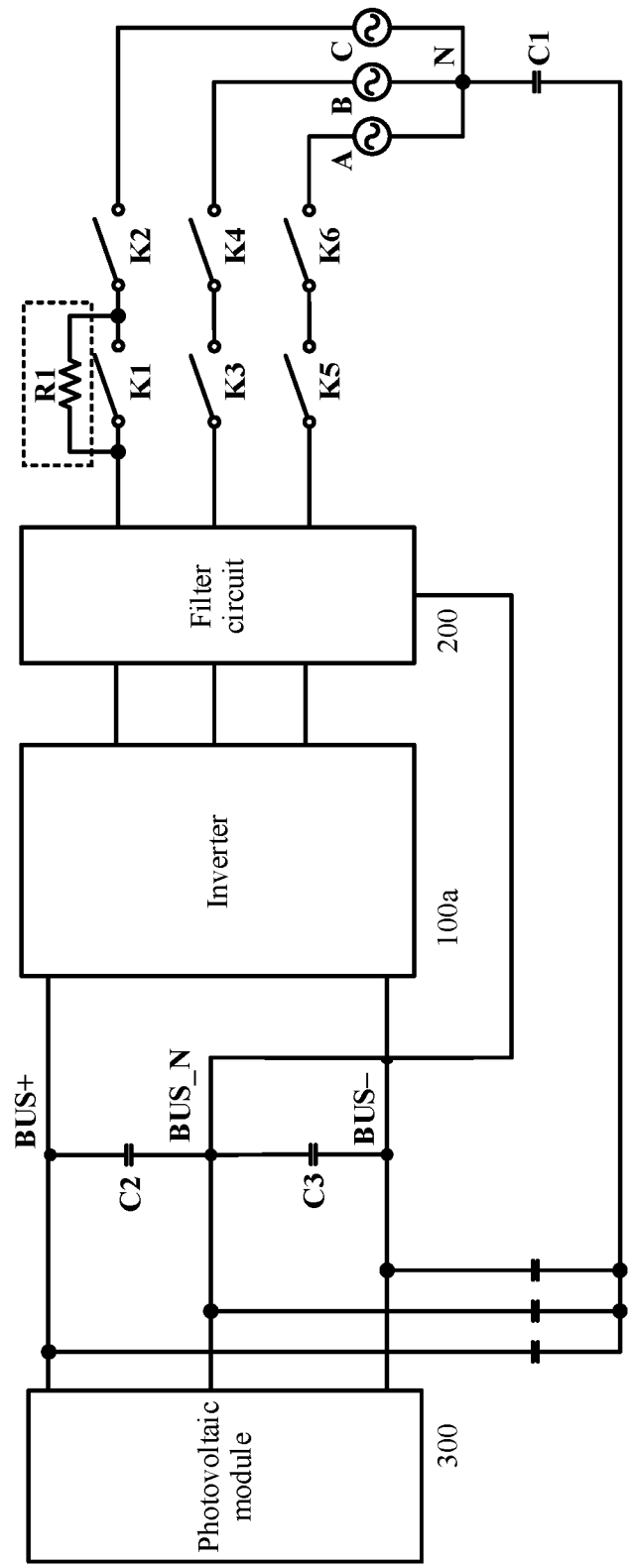
FIG. 12 is a schematic diagram of a power supply system according to an embodiment of this application.

The power supply system may be a photovoltaic power supply system. FIG. 12 shows a photovoltaic power supply system according to an embodiment of this application. Three-phase power supply is used as an example, in other words, the photovoltaic power supply system may further include a photovoltaic module 300.

The input end of the inverter 100a is connected to the photovoltaic module 300.

The photovoltaic module 300 is configured to convert solar energy into a direct current and output the direct current to the input end of the inverter 100a.

In addition, it may be understood that a direct current-direct current converter, namely, a DC-DC converter, may be further included between the photovoltaic module 200 and the inverter 100a. In actual application, the DC-DC converter may also be integrated inside the inverter 100a. The DC-DC converter may be a boost circuit, namely, a Boost circuit.

In addition, when the power converter is a rectifier, and the downstream circuit is an alternating current power network.

The rectifier is configured to rectify an alternating current at an input end of the rectifier into a direct current and supply the direct current to a direct current load, in other words, electric power is transferred from the alternating current power network to a rectifier side.

In this embodiment of this application, a type of the power converter is not specifically limited, and a specific type of the power supply system is not specifically limited.

It should be understood that, in this application, "at least one (item)" means one or more, and "a plurality of" means two or more. "And/or" is used to describe an association relationship of associated objects, and indicates that three relationships may exist. For example, "A and/or B" may indicate three cases: only A exists, only B exists, and both A and B exist, where A and B may be singular or plural numbers. The character "/" generally indicates an "or" relationship between associated objects. "At least one of the following (items)" or a similar expression means any combination of these items, including a single item or any combination of a plurality of items. For example, at least one of a, b, or c may represent a, b, c, "a and b", "a and c", "b and c", or "a, b, and c", where a, b, and c may be a single one, or may be a plurality of.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A device for resolving common-mode voltage interference, applied to a power supply system, wherein the power supply system comprises a power converter and a switch mechanism, each phase of an output end of the power converter is connected to a downstream circuit by using the switch mechanism, the power converter is configured to perform electric energy conversion, and the switch mechanism comprises a first switch component and a second switch component that are connected in series, wherein the device comprises:
   a controller; and
   a passive component;
   wherein two ends of the first switch component in at least one phase of the output end of the power converter are connected in parallel to the passive component; and
   wherein the controller is configured to:
      control the second switch component to be turned on; and
      when a voltage difference between the two ends of the first switch component is less than a preset voltage, control the first switch component to be turned on.

2. The device according to claim 1, wherein the two ends of the first switch component in each phase of the output end of the power converter are connected in parallel to a respective passive component.

3. The device according to claim 1, wherein two ends of the second switch component in at least one phase of the output end of the power converter are connected in parallel to a respective passive component.

4. The device according to claim 3, wherein the two ends of the second switch component in each phase of the output end of the power converter are connected in parallel to a respective passive component.

5. The device according to claim 1, wherein the passive component comprises at least one of:
   an inductor, a resistor, a capacitor, or a diode.

6. The device according to claim 1, wherein the switch mechanism comprises one of:
   a relay, a contactor, a circuit breaker, an insulated gate bipolar transistor, or a metal-oxide semiconductor field-effect transistor.

7. A method for operating a device for resolving common-mode voltage interference, the device is applied to a power supply system, the power supply system comprises a power converter and a switch mechanism, each phase of an output end of the power converter is connected to a downstream circuit by using the switch mechanism, the power converter is configured to perform electric energy conversion, the switch mechanism comprises a first switch component and a second switch component that are connected in series, the device comprises a controller and a passive component, and two ends of the first switch component in at least one phase of the output end of the power converter are connected in parallel to the passive component, wherein the method comprises:
   controlling the second switch component to be turned on; and
   when a voltage difference between the two ends of the first switch component is less than a preset voltage, controlling the first switch component to be turned on.

8. A power supply system for resolving common-mode voltage interference, the power supply system comprising:
   a power converter;
   a switch mechanism; and
   a device, the device comprising a controller and a passive component;
   wherein:
      each phase of an output end of the power converter is connected to a downstream circuit by using the switch mechanism;
      the power converter is configured to perform electric energy conversion;

the switch mechanism comprises a first switch component and a second switch component that are connected in series;

two ends of the first switch component in at least one phase of the output end of the power converter are connected in parallel to the passive component; and the controller is configured to:

control the second switch component to be turned on; and when a voltage difference between the two ends of the first switch component is less than a preset voltage, control the first switch component to be turned on.

9. The power supply system according to claim 8, wherein the power supply system is a three-phase power supply system.

10. The power supply system according to claim 9, wherein the power converter is an inverter, and the downstream circuit is an alternating current power network or an alternating current load; and wherein the inverter is configured to convert a direct current at an input end of the inverter into an alternating current and supply the alternating current to the downstream circuit.

11. The power supply system according to claim 10, further comprising a photovoltaic circuit, wherein:

the input end of the inverter is connected to the photovoltaic circuit; and the photovoltaic circuit is configured to convert solar energy into a direct current.

12. The power supply system according to claim 8, wherein the power converter is a rectifier, and the downstream circuit is an alternating current power network; and wherein the rectifier is configured to rectify an alternating current at an input end of the rectifier into a direct current and supply the direct current to a direct current load.

* * * * *